United States Patent
Wang

(10) Patent No.: US 9,525,297 B2
(45) Date of Patent: Dec. 20, 2016

(54) AUTOMOBILE CHARGER

(71) Applicant: Wang's International, Inc., City of Industry, CA (US)

(72) Inventor: Calvin Shiening Wang, City of Industry, CA (US)

(73) Assignee: Wang's International, Inc., City of Industry, CA (US)

( * ) Notice: Subject to any disclaimer, the term of this patent is extended or adjusted under 35 U.S.C. 154(b) by 201 days.

(21) Appl. No.: 14/569,352

(22) Filed: Dec. 12, 2014

(65) Prior Publication Data

US 2015/0306964 A1    Oct. 29, 2015

(30) Foreign Application Priority Data

Apr. 28, 2014  (CN) .................. 2014 2 0212173 U

(51) Int. Cl.
  *H02J 7/00*    (2006.01)
  *B60L 11/18*   (2006.01)
  *H02J 9/00*    (2006.01)

(52) U.S. Cl.
  CPC ............ *H02J 7/0065* (2013.01); *H02J 7/0029* (2013.01); *H02J 9/005* (2013.01)

(58) Field of Classification Search
  CPC .............. B60L 11/1811; B60L 11/1816; B60L 11/1861; H02J 7/0029
  USPC ....................................... 320/162
  See application file for complete search history.

(56) References Cited

U.S. PATENT DOCUMENTS

| 5,487,002 A * | 1/1996 | Diller et al. ........ B60L 11/1861 320/128 |
| 8,183,821 B2* | 5/2012 | Sakurai ............... B60L 11/1803 320/104 |
| 8,253,376 B2* | 8/2012 | Gale et al. ................ H02J 7/02 320/107 |
| 8,447,543 B2* | 5/2013 | Dickinson et al. . B60L 11/1816 702/58 |
| 8,565,930 B2* | 10/2013 | Miwa ..................... B60K 6/445 141/192 |
| 9,333,865 B2* | 5/2016 | Kawasaki et al. .. B60L 11/1811 |

* cited by examiner

*Primary Examiner* — Sun Lin
(74) *Attorney, Agent, or Firm* — Sheridan Ross PC

(57) ABSTRACT

A novel automobile charger which comprise a direct current voltage supply, wherein a positive pole of the direct current voltage supply is connected with one end or lead of a DC to DC module, one end of a battery voltage detection module and one end of a load module simultaneously, while a negative pole of the direct current voltage supply is connected with another end of the DC to DC module, one end of a microcontroller, one end of an automobile start control module and another end of the battery voltage detection module simultaneously. A third end of the DC to DC module is connected with another end of the microcontroller. Other three ends of the microcontroller are connected with the third end of the battery voltage detection module, another end of the automobile start control module and one end of a load detection module respectively. Another end of the load detection module is connected with a third end of the automobile start control module and another end of the load module simultaneously.

6 Claims, 2 Drawing Sheets

AUTOMOBILE CHARGER

RELATED APPLICATIONS

This application claims the benefit of priority of Chinese application no. 201420212173.5 filed Apr. 28, 2014, the entire content of which is incorporated herein by reference.

BACKGROUND

The present disclosure relates to an automobile charging device, in particular relates to a novel automobile charger with a safe power supply charging quickly.

Automobile charging is a big issue of traveling by automobile for those automobile fans and businessmen, the maturity of the technology thereof is one of the critical factors restricting the application of the automobile charger. However, current automobile chargers have common problems of not able to automatically detect whether a load is connected, whether an electrode is connected with an automobile storage battery reversely, whether an automobile engine or the storage battery has a reverse current, whether the battery state is suitable for heavy current power generation and so on. Accordingly, the present disclosure provides a novel automobile charger with the safe power supply charging quickly to solve the problems mentioned above, thus making the automobile charging safe, quick, mature and propagable.

SUMMARY

A purpose of the present disclosure aims to provide a novel automobile charger with the safe power supply charging quickly, in order to solve the problems presented in the above background.

To achieve the purpose described above, the present disclosure provides the following technical solutions: a novel automobile charger comprises a direct current power supply, wherein a positive pole of the direct current power supply is connected with one end of a DC to DC module, one end of a battery voltage detection module and one end of a load module simultaneously, while a negative pole of the direct current voltage is connected with the other end of the DC to DC module, one end of a microcontroller, one end of an automobile start control module and the other end of the battery voltage detection module simultaneously. A third end of the DC to DC module is connected with the other end of the microcontroller, and the other three ends of the microcontroller are connected with the third end of the battery voltage detection module, the other end of the automobile start control module and one end of the load detection module respectively, wherein the other end of the load detection module is connected with the third end of the automobile start control module and the other end of the load module simultaneously; the load module which comprises the automobile storage battery and the automobile engine is located on the end of the load module.

As a further solution of the present disclosure that: the DC to DC module provides a stable voltage for the microcontroller which collects relevant data to conduct the corresponding control. The battery voltage detection module conducts the measurement of the batter voltage, the automobile start control module conducts the power supply or the power outage for the load module through the microcontroller, and the load detection module which comprises the automobile storage battery or the automobile engine detects whether the load module is correctly connected.

As a further solution of the present disclosure that: the circuit employs an electronic switch to supply power to the load module, which can offer more protection for the product, or reduce the product size and the material cost.

As a further solution of the present disclosure that: the battery voltage detection module provides protection for the power supply battery to prevent damages caused by the discharging of the direct current power supply.

As a further solution of the present disclosure that: the load detection module prevents improper operations of the user.

As a further solution of the present disclosure that: in the standby mode, the microcontroller closes all outputs when the voltage of the direct current power supply is lower than that of the state being able to supply power and then recovers when it is higher than that of the state being able to supply power.

As a further solution of the present disclosure that: the automobile start control module is the electronic switch.

Compared to the prior art, the present disclosure has the beneficial effects that:

1. The present disclosure employs the electronic switch to control the supply power for the load, this part can offer more protection for the product, and reduce the product size and the material cost.

2. The battery detection of the present disclosure can provide low voltage protection to prevent damages caused by the over discharging of the battery.

3. The load detection of the present disclosure can prevent improper operations by the user, such as reversed polarity, which causes damages to the automobile or the direct current power supply.

4. The present disclosure employs the voltage backflow protection for abnormal load, wherein the automobile start line is closed to protect the battery when the abnormal voltage is detected.

5. The present disclosure has a fast charging function, and can be installed fixedly or moved portably according to the use requirements of people.

6. The automatic detection module of the present disclosure can automatically detects whether the load is connected, whether the electrode is connected with the automobile storage battery reversely, whether the automobile engine or the storage battery has reverse current, whether the battery state is suitable for heavy current power generation, thereby protecting the load and the circuit and thus has complete functions.

In FIGS.: 1—DC to DC module, 2—microcontroller, 3—battery voltage detection module, 4—automobile start control module, 5—load detection module, 6—load module, 7—direct current power supply.

DETAILED EMBODIMENTS

The technical solutions of the present disclosure will be described more clearly and fully in conjunction with drawings in the embodiments of the present disclosure, and obviously, the described embodiments are merely a part of the embodiments of the present disclosure, not all the embodiments. Based on the embodiments of the present disclosure, all the other embodiments obtained by the ordinary skilled in the art without creative labors belong to the scope claimed by the present disclosure.

Figure 1:
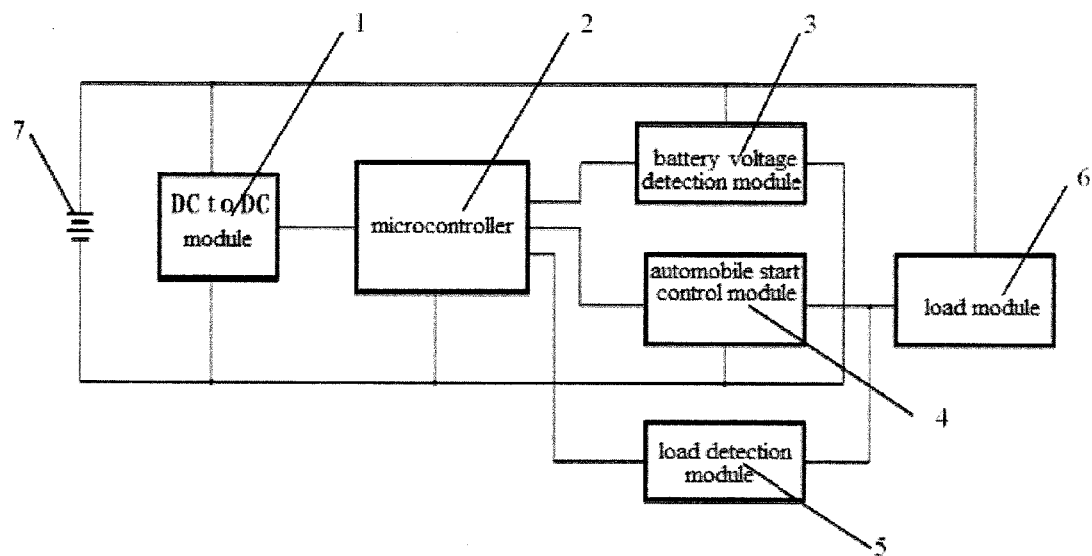
FIG. 1 is a block diagram for the principle of the emergency power supply of the safe intelligent automobile.

Refer to FIG. 1, a novel automobile charger comprises a direct current power supply, wherein the positive pole of the direct current power supply is connected with one end or lead of the DC to DC module, one end of the battery voltage detection module and one end of the load module simultaneously, while the negative pole of the direct current voltage is connected with the other end of the DC to DC module, one end of the microcontroller, one end of the automobile start control module and the other end of the battery voltage detection module simultaneously. A third end of the DC to DC module is connected with the other end of the microcontroller, and the other three ends of the microcontroller are connected with the third end of the battery voltage detection module, the other end of the automobile start control module and one end of the load detection module respectively, wherein the other end of the load detection module is connected with the third end of the automobile start control module and the other end of the load module simultaneously; the load module which comprises the automobile storage battery and the automobile engine is located on the end of the load module.

Figure 2:
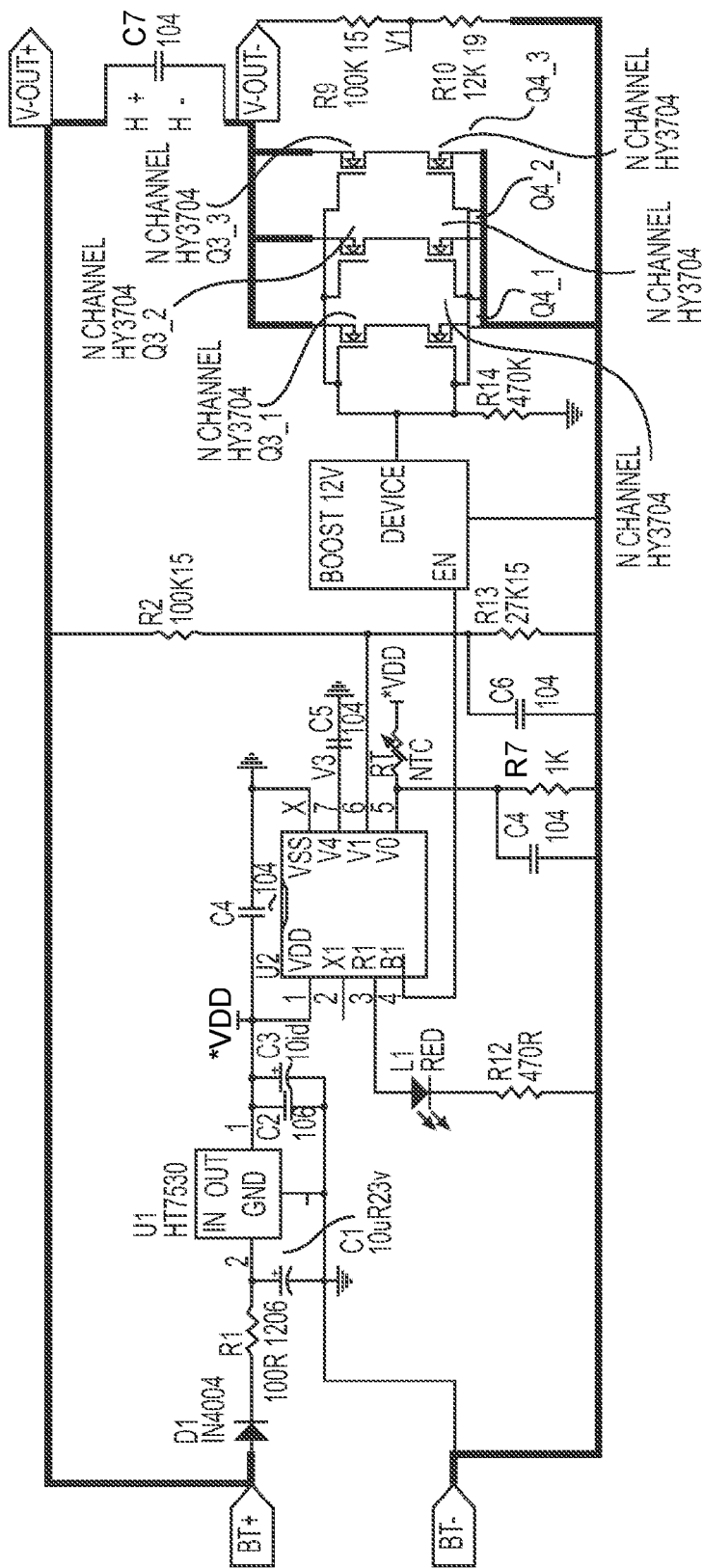
FIG. 2 is a circuit diagram for the emergency power supply of the safe intelligent automobile.

Refer to FIG. 2, the DC to DC module comprises a diode D1, a resistor R1, capacitor C1, a HT7530 voltage stabilizing tube, capacitors C2 and C3, wherein the positive pole of the diode D1 is connected with the positive pole of the battery, the negative pole of the diode D1 is connected with one end of the capacitor C1 and an IN port of the HT7530 voltage stabilizing tube simultaneously through the resistor R1, and an OUT port of the HT7530 voltage stabilizing tube is connected with one end of the capacitor C2, one end of the capacitor C3 and a VDD port of the microcontroller U2, while the other end of the capacitor C1, the other end of the capacitor C2 and the other end of the capacitor C3 as well as a GND port of the HT7530 voltage stabilizing tube are grounded and connected with the negative pole of the battery simultaneously; a R1 port of the microcontroller U2 is connected with the negative pole of the battery through a light-emitting diode L1 and a resistor R12 which are in series connection, a B1 port of the microcontroller U2 is connected with a EN port of the automobile start control module, a V0 port of the microcontroller U2 is connected with the negative pole of the battery through a capacitor C4 and a resistor R7 which are in parallel connection, the V0 port is also connected with the VDD port through a slide rheostat RT, a V1 port of the microcontroller U2 is also connected with the negative pole of the battery through a resistor 10, a capacitor C6 and a resistor R13 which are in parallel connection, the V1 port is connected with the positive pole of the battery through a resistor R2, and is also connected with the negative pole of the automobile storage battery and the automobile engine simultaneously through a resistor R9, wherein two ends of the automobile storage battery are in parallel connection with the capacitor C7, resistors R9, 10, a capacitor C6 and a resistor R13 to form the load detection module together, a V4 port of the microcontroller U2 is grounded through a capacitor C5, a VSS port of the microcontroller U2 and one end of the capacitor C4 are grounded simultaneously. The other end of the capacitor C4 is connected with the VDD port of the microcontroller U2, the resistors R2, R13 and capacitor C6 form the battery voltage detection module together, and a Drive port of the automobile start control module is connected with the automobile engine and one end of a resistor R14 simultaneously, wherein the other end of the resistor R14 is grounded.

The DC to DC module in the present disclosure provides the stable voltage for the microcontroller which collects relevant data to conduct the corresponding control. The battery voltage detection module conducts the measurement of the batter voltage, and the automobile start control module conducts the power supply or the power outage for the load module through the microcontroller, wherein the load detection module detects whether the load module is correctly connected.

The microcontroller in the present disclosure determines whether the automobile storage battery is connected with the automobile engine through the load detection module, wherein the automobile start control model is automatically activated and the battery starts to supply power to the load module when the load is correctly connected; the automobile start control model is automatically deactivated and the battery stops supplying power to the load module when assuming that the load is not connected or the positive and negative polarities are reversely connected. In the standby mode, the microcontroller closes all outputs when the battery voltage is lower than 9V, and recovers the normal operation only when the battery voltage is larger than 10V; the automobile engine will generate the normal voltage to recharge the battery after the automobile starts, whereas the automobile start control module is deactivated immediately once the recharging voltage is larger than the voltage before that battery starts the power supply, to protect the battery from damages caused by charging with the normal voltage; the automobile start control module is the electronic switch, which can prevent the load from being reversely connected and recharging of the normal voltage, thus protecting the battery and prolonging lifespan.

The automobile engine will generate abnormal voltage to recharge the direct current power supply after the automobile starts, and the automobile start control module is deactivated immediately once the recharging voltage is larger than the voltage before the direct current power supply starts the power supply, to protect the direct current power supply from damages caused by charging with normal voltage charge.

It is obvious for the skilled people in the art that the present disclosure is not merely limited to the details of the above exemplary embodiments, and the present disclosure can be implemented in other specific forms without departing from the sprits or the basic features of the present disclosure. Thus, no matter to consider from which point of view, the embodiments should be considered as exemplary and non-limiting. The scope of the present disclosure is defined by the accompanying Claims rather than the above description, therefore it is intended that all the changes fallen within the meanings and scope of the equivalent elements of the Claims are contained in the present disclosure. Any drawing reference in the Claims should not be regarded as limiting the Claims involved.

Furthermore, it should be understood that although the specification is described according to the embodiments, but not every embodiment includes only an independent technical solution, this manner of description for the specification is only for clarity, therefore the skilled people in the art should take the Specification as a whole, and the technical solutions in various embodiments can be combined appropriately to form other implementations understandable for those skilled in the art.

What is claimed is:

1. A novel automobile charger which comprises a direct current power supply, comprising:
   a positive pole of the direct current voltage connected with a first lead of a DC to DC module, a first lead of a battery voltage detection module, and a first lead of a load module simultaneously,
   a negative pole of the direct current power supply connected with a second lead of the DC to DC module, a first lead of a microcontroller, a first lead of an automobile start control module and a second lead of the battery voltage detection module simultaneously;
   a third lead of the DC to DC module connected with a second lead of the microcontroller, and
   three additional leads of the microcontroller connected with a third lead of the battery voltage detection module, a second lead of the automobile start control module and a first lead of a load detection module respectively,
   wherein a second lead of the load detection module is connected with a third lead of the automobile start control module and a second lead of the load module simultaneously;
   the load module including an automobile storage battery and an automobile engine is located on one end of an automobile.

2. The novel automobile charger according to claim 1, wherein the DC to DC module includes a diode D1, a resistor RI, a capacitor C1, a HT7530 voltage stabilizing tube, a capacitor C2 and a capacitor C3,
   a positive pole of the diode D1 is connected with a positive pole of a battery,
   a negative pole of the diode D1 is connected with a first lead of the capacitor C1 and
   an IN port of the HT7530 voltage stabilizing tube through the resistor R1 simultaneously, and
   an OUT port of the HT7530 voltage stabilizing tube is connected with a first lead of the capacitor C2, a first lead of the capacitor C3 and a VDD port of a microcontroller U2 simultaneously,
   a second lead of the capacitor C1, a second lead of the capacitor C2 and a second lead of the capacitor C3 as well as a GND port of the HT7530 voltage stabilizing tube are grounded and connected with a negative pole of the battery simultaneously;
   a R1 port of the microcontroller U2 is connected with the negative pole of the battery through a luminous diode L1 and a resistor R12 in series connection,
   a B1 port of the microcontroller U2 is connected with a EN port of the automobile start control module,
   a V0 port of the microcontroller U2 is connected with the negative pole of the battery through a capacitor C4 and a resistor R7 in parallel connection and is also connected with the VDD port through a slide rheostat RT,
   a V1 port of the microcontroller U2 is connected with the negative pole of the battery through a resistor R10, a capacitor C6 and a resistor R13 in parallel connection,
   the V1 port is also connected with the positive pole of the battery through a resistor R2 and is also connected with a negative pole of the automobile storage battery and the automobile engine simultaneously through a resistor R9,
   wherein two leads of the automobile storage battery are in parallel connection with the capacitor C7, the resistors R9, R10, the capacitor C6 and the resistor R13 together to form the load detection module,
   a V4 port of the microcontroller U2 is grounded through a capacitor C5,
   a VSS port of the microcontroller U2 and one end of a capacitor C4 are grounded;
   simultaneously,
   the second lead of the capacitor C4 is connected with the VDD port of the microcontroller U2,
   the resistor R2, the capacitor C6 and the resistor R13 form the battery voltage detection module together, and
   a drive port of the automobile start control module is connected with the automobile engine and one end of a resistor R14 simultaneously, wherein the other end of the resistor R14 is grounded.

3. The automobile charger according to claim 1, wherein the DC to DC module is operably configured to provide a stable voltage for the microcontroller which collects relevant data to conduct corresponding control, and
   the battery voltage detection module conducts a measurement of the voltage of the battery,
   the automobile start control module conducts power supply or power outage for the load module through the microcontroller, wherein the load detection module detects whether the load module is correctly connected.

4. The automobile charger according to claim 1, wherein the battery voltage detection module further being operably configured to provide a protection for a power supply battery of the direct current power supply.

5. The automobile charger according to claim 1, further comprising programmatic instructions such that, when placed in a standby mode, the microcontroller closes all outputs when a voltage of the direct current power supply is lower than that of a state being able to supply power and then recovers when it is higher than that of the state being able to supply power.

6. The automobile charger according to claim 1 wherein the automobile start control module is an electronic switch.

* * * * *

UNITED STATES PATENT AND TRADEMARK OFFICE
CERTIFICATE OF CORRECTION

PATENT NO. : 9,525,297 B2
APPLICATION NO. : 14/569352
DATED : December 20, 2016
INVENTOR(S) : Wang et al.

It is certified that error appears in the above-identified patent and that said Letters Patent is hereby corrected as shown below:

On the Title Page

Item (12) "Wang" should read -- Wang, et al. --.

Item (72) Inventor is corrected to read:
-- Calvin Shiening Wang, City of Industry (CA);
Chung-Hsin Wang, Shenzhen (CN) --.

Signed and Sealed this
Twenty-sixth Day of March, 2019

Andrei Iancu
*Director of the United States Patent and Trademark Office*